Feb. 22, 1955   A. M. WICKWIRE ET AL   2,702,597
ROTARY CUP TRIMMER WITH SCRAP CUTTER
Filed April 15, 1949   2 Sheets-Sheet 1

INVENTOR.
Arthur M. Wickwire and
Robert J. Killian
BY *Frease* and *Bishop*
ATTORNEYS Feb. 22, 1955   A. M. WICKWIRE ET AL   2,702,597
ROTARY CUP TRIMMER WITH SCRAP CUTTER
Filed April 15, 1949   2 Sheets-Sheet 2

INVENTOR.
Arthur M. Wickwire and
Robert J. Killian
BY Frease and Bishop
ATTORNEYS

United States Patent Office 2,702,597
Patented Feb. 22, 1955

2,702,597

ROTARY CUP TRIMMER WITH SCRAP CUTTER

Arthur M. Wickwire, North Canton, and Robert J. Killian, Canton, Ohio, assignors to Automatic Steel Products, Inc., Wilmington, Del., a corporation of Delaware Application April 15, 1949, Serial No. 87,612

3 Claims. (Cl. 164—60)

The invention relates to rotary stamping trimmer apparatus for trimming an annular edge of a cup-shaped stamping in a single plane, and more particularly to apparatus for simultaneously or coincidentally trimming a cup-shaped stamping and disposing of the continuous waste piece resulting from the trimming operation.

Rotary stamping trimmers have been used extensively for trimming innumerable sheet metal stamping shapes, but no provision has been made for handling and disposing of the continuous waste piece resulting from a trimming operation performed on such apparatus.

A rotary stamping trimmer of usual construction normally includes a stationary spindle and a movable spindle carrying rotary wheels moved into rotary shear cutting relationship by movement of the movable spindle toward the stationary spindle. The stamping to be trimmed is placed over one of the spindles and the movable spindle then moves toward the stationary spindle to trim the stamping edge by a roll-cutting operation. The rotary cutting tools on the spindles are somewhat or substantially smaller in diameter than the diameter or size of the stamping being trimmed.

After the trimming operation has been performed and the movable spindle has been moved away from the stationary spindle, the trimmed stamping is removed from the cutter wheels. The machine operator then must lift the continuous piece of metal or flash trimmed from the stamping from its location on the apparatus surrounding one of the spindles before the next stamping can be trimmed. This normally is possible because of the separation of the spindles and the substantially larger size of the trimmed flash with respect to the rotary cutter tool surrounded thereby. Nevertheless, the removal of the trimmed flash is a time-consuming operation materially reducing the production rate of the trimming machine and substantially increasing the cost of the trimming operation.

When it is desired to trim a relatively heavy gauge sheet metal cup on such rotary stamping trimmer apparatus using one rotary cutter wheel over which the work piece is telescoped having substantially the same outer diameter as the interior diameter of the work piece, the removal of the trimmed flash from the apparatus after each trimming operation becomes most difficult and time-consuming and reduces the productive capacity of the apparatus and increases the trimming costs to such degree that it is economically impractical where high production is desired to use such apparatus for the particular operation described.

However, such rotary trimming apparatus has an outstanding advantage in its ability to maintain close tolerances in the length of the trimmed annular wall of the work piece.

Accordingly, it is a primary object of the present invention to provide a novel rotary cutter construction for trimming cup-shaped sheet metal stampings in the use of which a separate operation of removing a continuous cut flash from one of the trimmer spindles after each trimming operation, is eliminated.

Also, it is an object of the present invention to provide a novel rotary stamping trimmer construction for trimming cup-shaped sheet metal stampings in which the continuous ring-like flash cut from the work piece is freed of encircling either of the cutter roll spindles and discharged from the cutter tools during the trimming operation.

Moreover, it is an object of the present invention to provide a novel rotary cutter construction for trimming cup-shaped sheet metal stampings which simultaneously trims a cup-shaped stamping, severs the continuous flash cut therefrom into sections, and discharges the severed flash sections to a zone away from the immediate vicinity of the rotary cutting tools.

Furthermore, it is an object of the present invention to provide a novel rotary stamping trimmer construction for trimming cup-shaped sheet metal stampings which may be used to trim a continuous annular wall of a work piece without encircling any cutter spindle shaft with the flash trimmed from the work piece.

Also, it is an object of the present invention to provide a novel rotary cutter construction for trimming cup-shaped sheet metal stampings in which two rotary cutting wheels on spindles are moved to and away from rotary shear cutting position to continuously roller shear between trimming edges of the cutting wheels an annular flash from a continuous annular wall of a work piece in slightly more than one revolution of at least one of the spindles while the rotary cutting wheels are in shear cutting position, and in which other cutting elements are associated with the trimming edges of the rotary cutters to sever the cut flash into one or more discontinuous pieces during said revolution of said one spindle.

Furthermore, it is an object of the present invention to provide a novel rotary cutter construction for trimming cup-shaped sheet metal stampings utilizing cooperating rotary cutting tools having cooperating trimming edges and cooperating flash severing elements.

In addition, it is an object of the present invention to provide a novel rotary stamping trimmer for trimming cup-shaped sheet metal stampings incorporating the advantages and eliminating the disadvantages and defects of prior rotary stamping trimmers.

Finally, it is an object of the present invention to provide a new rotary stamping trimmer construction for trimming cup-shaped sheet metal stampings having a very simplified arrangement of rotary cutting tools constructed and operated to obtain maximum productive capacity, unaffected by the matter of disposing of the trimmed flash, at a minimum unit cost for the trimming operation.

These and other objects and advantages apparent to those skilled in the art from the following description and claims may be obtained, the stated results achieved, and the described difficulties overcome, by the devices, constructions, arrangements, combinations, sub-combinations, parts, elements, methods, discoveries and principles which comprise the present invention, the nature of which is set forth in the following general statement, a preferred embodiment of which—illustrative of the best mode in which applicants have contemplated applying the principle—is set forth in the following description and shown in the drawings, and which are particularly and distinctly pointed out and set forth in the appended claims forming part hereof.

The nature of the invention may be stated in general terms as preferably including in rotary stamping trimmer apparatus, a stationary spindle, a movable spindle, rotary cutter means mounted on each spindle for rotation thereon and movement therewith, said rotary cutter means including cutter wheel shear cutting trimming edges adapted to be moved preferably to overlapped rotary cutting position upon movement of the movable spindle toward the stationary spindle, and said rotary cutter means also including a cutting face mounted on one of the spindles and one or more cutting elements mounted on the other spindle brought into cooperative cutting relation upon rotation of the spindles and movement of the movable spindle toward the stationary spindle, whereby when a cup-shaped work piece is telescoped over one of the cutter wheels and the movable spindle is moved toward the stationary spindle the cooperating trimming edges of the cutter wheels thereon shear cut an annular flash from an annular wall of the cup-shaped work piece during substantially one revolution of the telescoped cutter wheel and the cutting elements sever the flash into one or more discontinuous pieces.

By way of example, a preferred embodiment of the improved rotary cutter construction of the present invention is illustrated in the accompanying drawings forming part hereof wherein.

Similar numerals refer to similar parts throughout the various figures of the drawings.

In the manufacture of spun V-groove pulleys it is desirable, preparatory to spinning a V-groove in the work piece, to provide a cup-shaped work piece with a cylindrical wall in which the V-groove is later formed, and to maintain close tolerances in the axial length of such cylindrical wall. Such a cup-shaped pulley blank is generally indicated at 1 in Fig. 7, the cylindrical wall in which the V-groove is to be formed being indicated at 2. The axial length L of the cylindrical wall 2 is the dimension to be maintained with accuracy in the volume production of pulley blanks 1.

Figures 5, 6, 7:
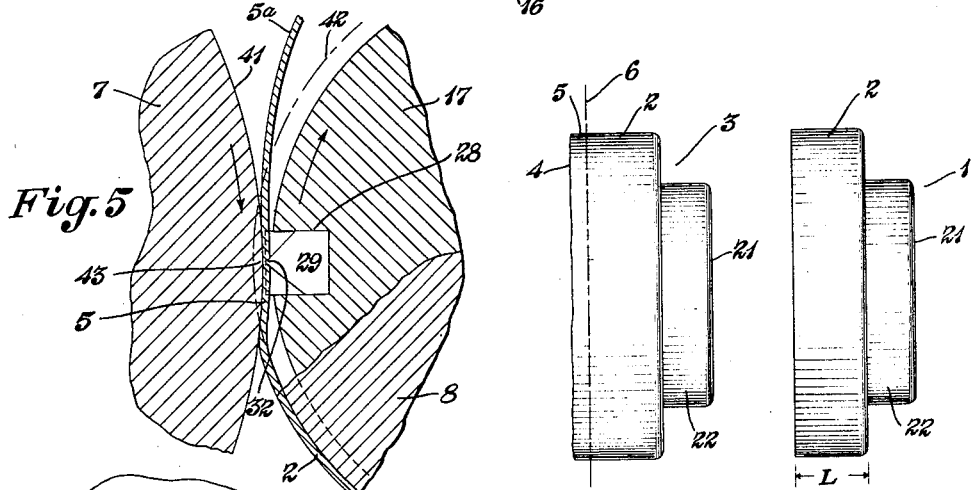
Fig. 5 is an enlarged fragmentary sectional view taken on the line 5—5, Fig. 1.
Fig. 6 is a side elevation of a stamping prior to trimming.
Fig. 7 is a view similar to Fig. 6 showing a trimmed stamping.

Pulley blanks 1 are preferably formed as stampings from flat sheet or strip metal blanks, a cup-shaped stamping as stamped being generally indicated at 3 in Fig. 6 having the usual and characteristic scalloped or wavy edge 4 at the open annular edge of the cup-shaped blank. In order to form the pulley blank 1 from the stamping 3, a continuous circular flash ring 5 must be trimmed from the stamping 3 in a single plane as indicated by the dot-dash line 6 in Fig. 6.

We have discovered that in the production manufacture of pulley blanks 1, the closest tolerances in the length L of the wall 2 of blanks 1 may be maintained in successive work pieces when the flash 5 is trimmed from stampings 3 by a rotary trimming operation on a rotary stamping trimmer. It is, therefore, of utmost importance in the manufacture of spun V-groove pulleys that the trimming operation be carried out on a machine of the type known as a "rotary stamping trimmer," as distinguished from other trimming apparatus for performing a trimming operation on an annular wall of a cup-shaped stamping.

Because of these special advantages in the use of the improved apparatus in connection with the manufacture of V-groove pulleys, cup-shaped pulley blanks 1 are illustrated and described in connection with a description of the present invention. However, it is to be understood that the principles and improvements of the present invention may be utilized in trimming cup-shaped stampings used for purposes other than the manufacture of V-groove pulleys.

The improved rotary cutter construction includes a lower circular rotary cutter wheel generally indicated at 7 and an upper circular rotary cutter wheel generally indicated at 8. The lower cutter 7 is preferably secured by cap screws 9 to an arbor 10 secured to movable spindle 11 by nut 12. The arbor 10 also may be keyed to spindle 11.

Similarly, the upper cutter wheel 8 may be secured to stationary spindle 13 by screw 14 and the upper cutter 8 likewise may be keyed to spindle 13. Spindles 11 and 13 are relatively movable spindles of a usual and well-known type of rotary stamping trimmer projecting upward on axes always maintained parallel from a trimmer housing 15 and through work table 16. A differential drive mechanism (not shown) is located in housing 15 for rotating spindles 11 and 13 in unison. Means is also provided in such rotary stamping trimmers for moving movable spindle 11 toward and away from stationary spindle 13 between the separated position shown in Fig. 2 and the trimming position shown in Fig. 1.

Figure 2:
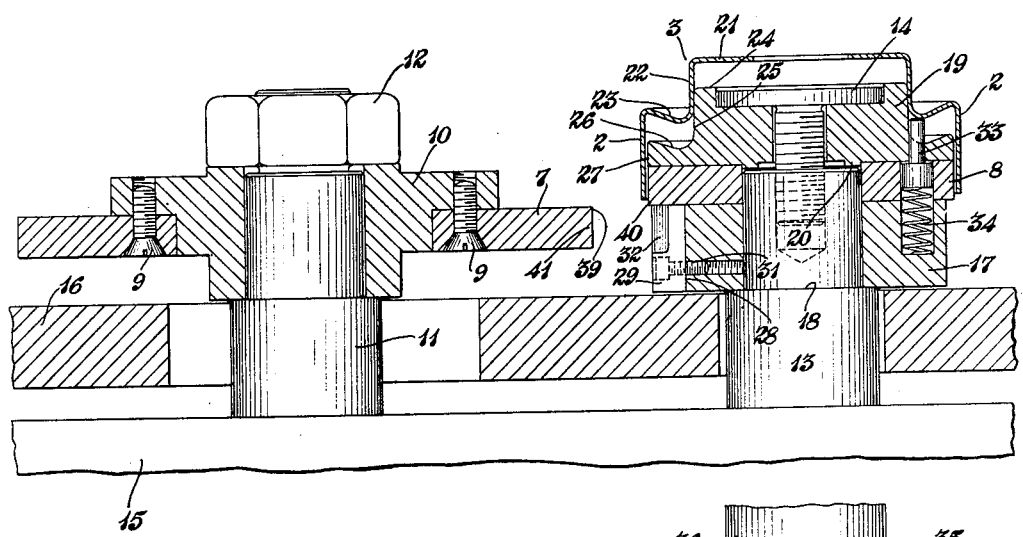
Fig. 2 is a view similar to Fig. 1 but showing the spindles and rotary cutting tools separated with a cup to be trimmed telescoped over one of the rotary cutters just prior to commencing a trimming operation.
Figure 1:
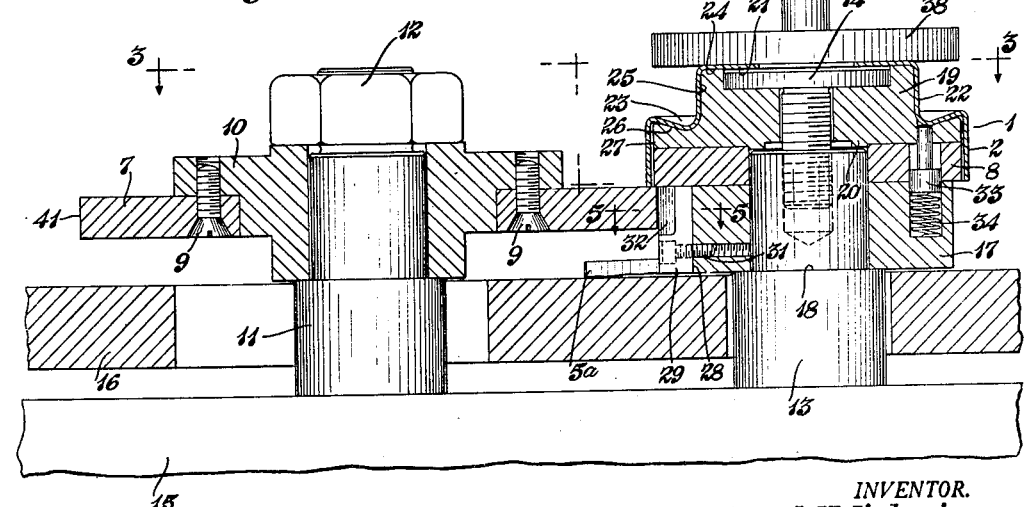
Figure 1 is a fragmentary cross-section of the improved rotary cutters in the act of carrying out a trimming operation taken as on the line 1—1, Fig. 3.

Usual mechanism, controls and safety devices are also provided for operating the rotary stamping trimmer in cycled operation so that by pressing an operating button or buttons or by actuating a control lever or levers, the spindles 11 and 13 rotate, spindle 11 moves toward spindle 13 to the position shown in Fig. 1, a rotary trimming operation is performed during slightly over one revolution of stationary spindle 13, and movable spindle 11 then moves away from stationary spindle 13 to the position shown in Fig. 2. At this time, because of the differential drive for spindles 11 and 13, the rotation of spindle 13 may be slowed down or stopped to permit the trimmed work piece to be removed and a new work piece to be placed on spindle 13 after which the cycle is repeated for the new work piece upon actuation of the control means. Since the drive and control mechanism for the spindles 11 and 13 form no part of our invention they are not described or illustrated in further detail.

In assembling the upper cutter wheel 8 on spindle 13, a lower collar 17 is interposed between upper cutter 8 and shoulder 18 on spindle 13, and collar 17 also preferably is keyed to spindle 13. An upper collar 19 also is assembled on spindle 13, clamped between the head of screw 14 and the upper surface of upper cutter 8, collar 19 being centered with respect to cutter 8 by annular shoulder 20.

The top surface of collar 19, as shown, is shaped to conform to the internal shape of stamping 3 to be trimmed. Thus, referring to Figs. 1 and 2, stamping 3 has a hub or disc portion 21, a reduced cylindrical portion 22, a re-entrant flange portion 23 and cylindrical flange portion 2 to be trimmed. Collar 19 has a flat upper end 24 matching stamping disc portion 21, a cylindrical portion 25 matching and fitting within stamping cylindrical portion 22, a recessed groove 26 receiving stamping re-entrant flange 23, and an outer cylindrical surface 27 over which stamping cylindrical wall 2 fits.

The outer cylindrical surface 27 of collar 19 preferably has the same or substantially the same diameter as the outer diameter of upper cutter 8.

The lower collar 17 on stationary spindle 13 (Figs. 3, 4 and 5) is notched around its periphery as indicated at 28 for receiving a cut-off tool 29, three cut-off tools 29 being shown. The lower end of each cut-off tool 29 is provided with a hole 30 receiving a screw 31 which secures cut-off tool 29 to collar 17. The upper portion of each cut-off tool 29 is formed to provide a V-shaped cutting edge 32 projecting slightly outward of the periphery of collar 17 as best shown in Fig. 5.

Figure 3:
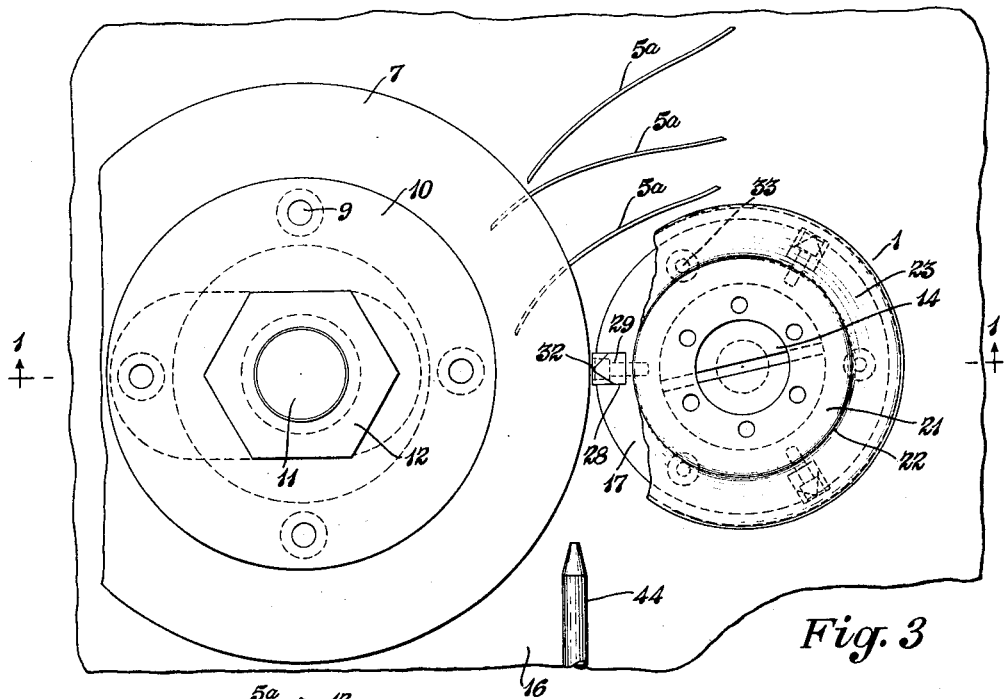
Fig. 3 is a fragmentary plan view with parts broken away looking in the direction of the arrows 3—3, Fig. 1.
Figure 4:
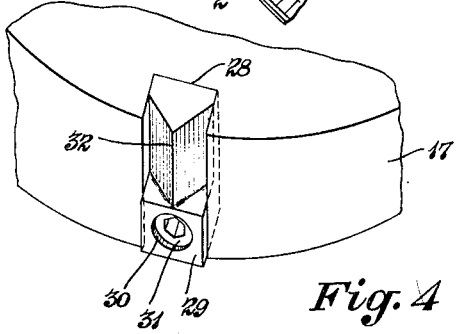
Fig. 4 is a fragmentary perspective view of one of the flash severing cutter elements.

The rotary cutter on spindle 13 also is provided with work piece ejector devices formed as headed pins 33 normally pressed upward (Figs. 1 and 2) by springs 34 mounted in upper cutter 8 and upper and lower collars 19 and 17, three ejector devices being shown (Fig. 3).

The stationary spindle 13 also is provided with a usual work piece hold-down device generally indicated at 35 comprising an air cylinder or other similar means 36 having a movable piston therein provided with a piston rod 37 terminating in a hold-down pad 38 which may rotate with spindle 13.

In operation, the circular cutting edge 39 of lower cutter wheel 7 cooperates with circular cutting edge 40 of upper cutter wheel 8 to trim flash 5 from stamping 3; and cutting edges 32 of cut-off tools 29 which extend axially of spindle 13 from points adjacent the cutting edge 40 of upper cutter wheel 8 cooperate with the cylindrical anvil face 41 which extends axially of spindle 11 from the cutting edge 39 of lower cutter 7 to sever the continuous flash 5 into one or more discontinuous pieces.

In the operation of the improved rotary cutter construction, a stamping 3 to be trimmed is telescoped over the rotary cutter assembly on stationary spindle 13 by the operator, the position of the parts being as shown in Fig. 2. The hold-down device 35 is then actuated so that the pad 38 thereof moves to the position illustrated in Fig. 1 clamping the stamping 3 in telescoped relation over upper collar 19, thus accurately positioning and holding the stamping so that the cylindrical flange wall 2 thereof will be trimmed a predetermined length L. This is accomplished because the re-entrant flange 23 of stamping 3 seats on recessed groove 26 in upper collar 19 which is a fixed predetermined distance away from trimming edge 40 of upper cutter 8.

As shown in Figs. 1 and 2, a slight clearance may be provided between the inner annular surface of cylindrical flange 2 and the outer cylindrical surface of upper cutter wheel 8 so that the stamping 3 may be readily telescoped over the cutter assembly.

As hold-down pad 38 moves to the position shown in Fig. 1, the ejector device pins 33 are depressed.

The rotary stamping trimmer control devices are then actuated in the manner previously described to rotate spindles 11 and 13, to move spindle 11 toward spindle 13 to carry out the trimming operation, and then to move spindle 11 away from spindle 13 to the position shown in Fig. 2. At this time the hold-down pad is actuated to raise the same to the position shown in Fig. 2 whereupon ejector pins 33 move upward to raise the trimmed pulley blank 2. At this time the operator may remove the trimmed pulley blank 1 from spindle 13 and place a new stamping 3 to be trimmed, thereon.

As the spindle 11 moves toward the trimming position of Fig. 1, the cutting edge 39 on lower cutter 7 passes beneath and overlaps the trimming edge 40 on upper cutter 8 to shear cut the annular flash 5 from the cylindrical wall 2 of stamping 3 along the line or plane indicated by dot-dash line 6 in Fig. 6. This shear cutting operation is indicated somewhat diagrammatically in Fig. 5 wherein the dot-dash arc 42 represents the location of trimming edge 40 of upper cutter 8 which is overlapped by the trimming edge 39 of lower cutter 7 represented by the arcuate periphery of member 7 as shown in Fig. 5.

As the cut-off tools 29 on lower collar 17, upon rotation of spindle 13, reach positions in or adjacent to a plane passing through the axes of spindles 11 and 13, one cut-off tool being shown in such position in Figs. 1, 2, 3 and 5, the cutting edges 32 thereof cooperate with the anvil face 41 of rotary cutter 7 to sever the flash 5 at 43 into sections 5a as illustrated in Figs. 1, 3 and 5.

Three cut-off tools 29 are illustrated, but it is to be understood that any number thereof may be provided and the number of cut-off tools determines the number of severed sections 5a of the flash 5. The severed flash sections 5a upon being cut at 43 are discharged from the rotary cutters by the rotation thereof to a zone or location on the table top 16 away from the cutters as illustrated in Fig. 3, when the upper cutter 8 is rotating in a clockwise direction as indicated by the arrow in Fig. 5. An air nozzle 44 may be mounted on the table top 16 blowing in the direction of flash sections 5a to move them along the table top to the edge thereof where they may drop to and collect in a scrap bin. Alternately any other desired means for disposing of the flash sections 5a may be provided.

In this manner the improved rotary cutter construction incorporates the advantageous characteristic of rotary stamping trimmers of maintaining close tolerances in the length L of the trimmed annular wall 2 of pulley blanks 1 and at the same time cuts or chops the trimmed flash 5 into sections 5a which are ejected from the cutter due to the rotation thereof to a position where the flash sections 5a do not interfere with the progress of work and need not be removed as a continuous ring from a position surrounding or encircling the cutter assembly on spindle 13 as a separate operation following the trimming operation.

In the usual construction of prior rotary stamping trimmers, if a cup-shaped stamping were trimmed merely by cutter wheels 7 and 8 using a cutting wheel 8 and upper collar 19 closely fitting within the stamping 3, the trimmed flash 5 would drop to the table 16 around lower collar 17, and being of substantially the same diameter would be difficult to remove.

In other words, the flash 5 in performing the trimming operation is not only trimmed from the stamping 3 but is cut up into pieces simultaneously with the trimming operation and the pieces are ejected from the cutter likewise simultaneously and incident to the rotary movement of the cutters.

It is apparent that the trimming line on which the flash 5 is severed from the cylindrical wall 2 of stamping 3 lies in a plane 6 normal to the axis of the cup-shaped stamping and that the lines 43 on which the flash 5 is severed into sections 5a extend angularly of the trimming line 6.

Accordingly, the present invention provides a rotary cutter construction for trimming cup-shaped stampings accurately to length while maintaining close tolerances in which a separate operation of removing the flash cut from the stamping is eliminated; in which the cut flash is freed from encircling the cutter spindles by severing the same and ejecting and discharging the severed sections from the rotary cutters; in which the advantages of prior rotary stamping trimmers are obtained and the disadvantages and defects in the operation and use thereof are eliminated; in which a very simplified cutting tool construction is provided; and in the use of which maximum productive capacity of the rotary stamping trimmer is obtained at minimum cost per trimming operation unaffected by the matter of disposing of the trimmed flash.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed.

Moreover, the embodiment of improved rotary cutter construction illustrated and described is by way of example, and the scope of the present invention is not limited to the exact details of construction of the various parts. Thus, only one shape of stamping 3 or trimmed blank 1 with a matching upper collar 19 is shown. However, the blank may have any desired shape or configuration within the scope of the present invention.

Having now described the features of the invention, the construction and operation of a preferred embodiment of the improved rotary cutter construction, and the advantageous, new and useful results obtained thereby; the new and useful devices, constructions, arrangements, combinations, sub-combinations, parts, elements, methods, discoveries and principles, and reasonable mechanical equivalents thereof, obvious to those skilled in the art, are set forth in the appended claims.

We claim:

1. In rotary cutter construction for trimming an annular edge of a cylindrical wall of a cup-shaped article to predetermined length, a pair of substantially parallel rotatable spindles, one of said spindles being mounted on a stationary axis and the axis of the other spindle being selectively reciprocally movable toward and away from the axis of said one spindle with one complete reciprocation for each cycle of trimming one cup-shaped article, rotary cutter means mounted on the spindles for rotation and movement therewith, said rotary cutter means including a circular cutter wheel on each spindle having a trimming edge adapted to be moved to and from overlapped rotary cutting position with respect to the other during each cycle of relative movement of the spindles toward and away from each other for trimming continuous annular flash from an edge of the article, said rotary cutter means also including an anvil face extending from the trimming edge of the cutter wheel mounted on one spindle and cutting element means located adjacent the trimming edge of the cutter wheel mounted on the other spindle with the cutting edges of said cutting element means laterally spanning the edge to be trimmed from the cup-shaped article and with said cutting edges being brought into cooperative cutting relation while the wheels are in overlapped rotary cutting position for simultaneously severing said annular flash during a single revolution of said other spindle, and means for holding a cup-shaped article on one of said rotary cutter wheels during the trimming operation, whereby during a trimming cycle a cup-shaped article may be placed over one of said cutter wheels, the other cutter wheel moved into cutting relation with said one cutter wheel for at least one complete revolution of said one cutter wheel, and said other cutter wheel then moved away from cutting relation with said one cutter wheel.

2. In rotary cutter construction for trimming to predetermined length an annular edge of a cylindrical wall of a cup-shaped article provided with a re-entrant flange spaced from the edge to be trimmed, a pair of substantially parallel rotatable spindles, one of said spindles being mounted on a stationary axis and the axis of the other spindle being selectively reciprocally movable toward and away from the axis of said one spindle with one complete reciprocation for each cycle of trimming one cup-shaped article, a rotary cutter wheel mounted on the movable spindle for rotation and cycled movement therewith having a circular cutting edge and a cylindrical anvil face extending from said cutting edge, a first collar mounted on the other spindle, a second rotary cutter wheel mounted on said other spindle above the collar, a second collar mounted on said other spindle above the second cutter wheel, said second cutter wheel having a circular cutting edge, annularly spaced cutoff tools mounted on the periphery of the first collar axially adjacent the cutting edge of the second cutter wheel with the cutting edges of the cutoff tools laterally spanning the edge to be trimmed from a cup-shaped article, the second collar having a groove therein complementary to the shape of the re-entrant flange on the article, means rotatable with said other spindle for holding the re-entrant flange seated in said groove, and ejector means mounted in the first and second collars and second cutter wheel communicating with said groove for ejecting the article from the second cutter wheel, whereby during a trimming cycle a cup-shaped article may be placed over one of said cutter wheels, the other cutter wheel moved into cutting relation with said one cutter wheel for at least one complete revolution of said one cutter wheel and said other cutter wheel then moved away from cutting relation with said one cutter wheel.

3. In rotary cutter construction for trimming an annular edge of a cylindrical wall of a cup-shaped article to predetermined length, a pair of continuously rotating substantially parallel vertical spindles, one of said spindles being mounted on a stationary axis and the axis of the other spindle being selectively reciprocally movable toward and away from the axis of said one spindle with one complete reciprocation for each cycle of trimming one cup-shaped article, rotary cutter means mounted on the spindles for rotation and movement therewith, said rotary cutter means including a circular cutter wheel on each spindle having a trimming edge adapted to be moved to and from overlapped rotary cutting position with respect to the other upon each cycle of relative movement of the spindles toward and away from each other, the rotary cutter wheel upon one of said spindles closely fitting the interior of the cup-shaped article to be trimmed, said rotary cutter means also including cutting element means mounted on said one spindle adjacent to the trimming edge of the last named cutter wheel with the cutting edges of said cutting element means laterally spanning the edge to be trimmed from the cup-shaped article, an anvil face extending from the trimming edge of the other cutter wheel brought into cooperative cutting relation with said cutting element means while the wheels are in overlapped rotary cutting position, ejector means mounted on the closely fitting cutter wheel on said one spindle for ejecting the article from the closely fitting cutter wheel while rotating and while the spindles are away from each other, and means for holding said cup-shaped article on one of said rotary cutter wheels during the trimming operation, whereby a cup-shaped article to be trimmed may be placed upon said one cutter wheel while the same is rotating, said other cutter may then be moved into cutting relation with said one cutter wheel, and in a single revolution of said one cutter wheel an annular flash is trimmed from the edge of the cup-shaped article by the cutter wheels and said annular flash is simultaneously severed by said cutting element means cooperating with said anvil face, and the trimmed cup-shaped article may be removed from said one cutter wheel while it continues to rotate and said other cutter wheel may be moved out of cutting relation with said one cutter wheel.

References Cited in the file of this patent

UNITED STATES PATENTS

| Number | Name | Date |
|---|---|---|
| 316,082 | Tyler et al. | Apr. 21, 1885 |
| 1,850,958 | Horvath | Mar. 22, 1932 |
| 2,119,942 | Hessenbruch | June 7, 1938 |
| 2,154,028 | Brosnan et al. | Apr. 11, 1939 |
| 2,203,738 | Nash | June 11, 1940 |
| 2,352,816 | Weightman | July 4, 1944 |